United States Patent [19]

Gresham

[11] 4,295,886

[45] Oct. 20, 1981

[54] FLAME-RETARDANT POLYESTER FIBER COMPOSITIONS

[75] Inventor: John T. Gresham, Somerset, N.J.

[73] Assignee: Avtex Fibers Inc., Valley Forge, Pa.

[21] Appl. No.: 404,198

[22] Filed: Oct. 9, 1973

[51] Int. Cl.$^3$ ................................................ C08K 5/53
[52] U.S. Cl. ................... 106/18.19; 106/18.2; 260/45.8 R; 260/45.85 R; 260/45.95 R; 428/921
[58] Field of Search ....... 260/45.8 R, 927 R, 45.95 R, 260/45.7 R, 860 R, 973, 970, 45.85 R, 857, 873; 117/137, 138.8 F; 106/18.19, 18.2, 18.17, 15 FP; 428/921

[56] References Cited

U.S. PATENT DOCUMENTS

| | | | |
|---|---|---|---|
| 2,726,256 | 12/1955 | Morris | 260/973 |
| 2,957,856 | 10/1960 | Guest et al. | 260/970 |
| 3,054,821 | 9/1962 | Rolih et al. | 260/970 |
| 3,141,032 | 7/1964 | Friedman | 260/927 |
| 3,455,713 | 7/1969 | Godfrey | 106/15 |
| 3,658,634 | 4/1972 | Yanagi et al. | 260/45.7 |
| 3,751,396 | 8/1973 | Gall | 260/40 |
| 3,755,165 | 12/1973 | Young et al. | 260/45.85 |

FOREIGN PATENT DOCUMENTS 47-43144 of 1972 Japan ................................ 260/927 R

*Primary Examiner*—V. P. Hoke
*Attorney, Agent, or Firm*—Arthur R. Eglington

[57] ABSTRACT

Flame-retardant polyester fibers containing 5 to 20% by weight of 3,9-diphenyl-2,4,8,10-tetraoxa-3,9-diphosphaspiro[5.5]undecane-3,9-dioxide, a novel compound, as the sole frame-retardant additive or a two-component additive comprising the aforesaid spirophosphonate in admixture with 20 to 80% of certain polychlorinated or polybrominated diaryl compounds.

8 Claims, No Drawings

FLAME-RETARDANT POLYESTER FIBER COMPOSITIONS

This invention relates to flame-retardant polyester fiber compositions. More particularly, this invention relates to flame-retardant polyester fibers which contain, as the flame-retardant additive, an organo spirophosphonate.

Polyester compositions containing organic phosphorus and organic halogen compounds are known and are disclosed, for example, in U.S. Pat No. 3,356,631 issued Dec. 5, 1971, to Jackson et al; U.S. Pat. No. 3,645,962 issued Feb. 29, 1972, to Schwarz; U.S. Pat. No. 3,681,281 issued Aug. 1, 1972, to Juelke et al; U.S. Pat. No. 3,688,001 issued Aug. 29, 1972, to Exner et al; U.S. Pat. No. 3,708,328 issued Jan. 2, 1973, to Kelkheim et al, West German Pat. No. 2,001,125 (1970) to Caldwell et al (Eastman Kodak Company), and U.S. Pat. No. 3,658,634 issued Apr. 25, 1972, to Yanagi et al. The aforesaid patents deal with various methods and additives for imparting flame retardance to polyesters. 3,9-dimethyl-2,4,8,10-tetraoxa-3,9-diphosphaspiro[5.5]undecane-3,9-dioxide is a known compound and is described in Dokl. Akad. Nauk. SSSR 153(3), p. 605–607 (1963). This spirophosphonate compounds is, however, a water soluble solid and is therefore unsuitable as a flame-retardant additive for polyester fiber.

These exemplary prior art compositions have a number of disadvantages in that they are either uneconomical for commercial use, or the additive is not compatible with molten polyester or is reactive with it, or the desired degree of flame retardancy is not obtained at suitable levels of concentration. It has always been desirable to provide efficient, but compatible flame-retardant additives which can be successfully incorporated into the molten polyester prior to the formation of fibers. Moreover, a particular problem in the art has been successfully providing flame-retardant polyester fibers which, when blended with other fibers, retain their flame retardant characteristics and impart to the finished fiber blend a high degree of flame retardancy.

According to the present invention, there are provided flame-retardant polyester fiber compositions comprising from about 95 to 80 parts by weight of a fiber-forming linear polyester and 5 to 20, preferably 10 to 15, parts by weight of 3,9-diphenyl-2,4,8,10-tetraoxa-3,9-diphosphaspiro[5.5]undecane-3,9-dioxide. This spirophosphonate compound has the formula

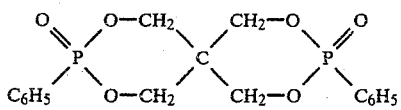

and is readily prepared by reacting appropriate quantities of pentaerythritol and phenylphosphonic dichloride in the presence of a suitable base such as pyridine. The spirophosphonate additive is believed to be a novel compound and, as such, constitutes a further embodiment of the present invention.

The organo spirophosphonate flame-retardant additive of the present invention has a number of desirable properties, which render it particularly suitable for preparation of flame-retardant polyester fibers. It is soluble in molten polyester and does not adversely affect the physical properties of the finished polyester fiber. It is thermally stable at temperatures up to about 325° C. in a nitrogen atmosphere and has a low volatility at 250°–300° C., the temperatures normally employed during the melt spinning of polyester fibers. Moreover, the spirophosphonate of the present invention is substantially inert in the presence of molten polyester for extended periods of time, thus, minimizing polymer degradation and crosslinking.

These properties enable the flame-retardant additive of the present invention to be incorporated into molten polyester prior to extrusion of the fiber. As is known in the art, polyester fibers are conventionally prepared by the melt spinning technique whereby molten polyester is extruded under pressure through a spinneret plate having a plurality of small circular openings about 0.009 inch in diameter. The spinning is carried out at a temperature of from about 260° to 300° C. for poly(ethylene terephthalate) fibers. The polymeric polyester has been previously prepared either by the batch method or by the continuous polymerization technique.

Thus, a flame-retardant additive which is thermally stable, unreactive with and soluble in molten polyester and non-volatile at spinning temperatures is particularly advantageous in that no additional fiber processing steps are required to be added to the manufacturing sequence. The additive is simply blended with the polyester melt and fibers are prepared in the usual way.

Flame-retardant polyester fibers containing the aforesaid organo spirophosphonate exhibit a high degree of flame retardancy. However, when polyesters are blended with other fibers, particularly cellulosic fibers such as rayon, the blended fiber usually exhibits an overall reduction in flame-retardant quality. Accordingly, a further embodiment of the present invention resides in flame-retardant polyester fibers comprising about 95 to 80 parts of a fiber-forming linear polyester and 5 to 20 parts by weight of a two-component flame-retardant additive consisting essentially of, by weight:

(a) from about 20 to 80% of 3,9-diphenyl-2,4,8,10-tetraoxa-3,9-diphosphaspiro[5.5]undecane-3,9-dioxide, and (b) from about 80 to 20% of a polychlorinated or polybrominated diaryl compound containing at least 40% by weight chlorine or bromine and having the general formula:

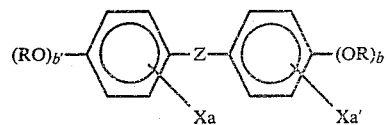

wherein X represents chlorine or bromine and a and a' are integers, the sum of which is from 3 to 10; b and b' represent zero or 1, R represents a member selected from the group consisting of $C_1$–$C_4$ alkyl radicals, $C_1$–$C_4$ acyl radicals such as acetyl, phenyl and benzoyl radicals and chlorinated and brominated phenyl and benzoyl radicals; Z represents a direct bond or a member selected from the group consisting of oxygen, carbonyldioxy, sulfonyl, $C_1$–$C_4$ alkylene, phenylene and chlorinated or brominated phenylene, dioxy radicals of the formula —$OR_1O$— where $R_1$ is $C_1$–$C_4$ alkylene, phenylene or chlorinated or brominated phenylene, and either linkages of the formula —$CH_2O$—, —$CH_2OCH_2$— and —$C_6H_4CH_2OCH_2C_6H_4$—.

Examples of suitable polychlorinated and/or polybrominated compounds may be shown by the following formulas I, II and III:

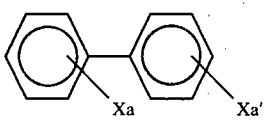
(I)

where X represents chlorine or bromine, a and a' are integers, the sum of which is from 3 to 10, preferably 5 to 10. Preferred compounds of this group include octabromobiphenyl, hexabromobiphenyl, decabromobiphenyl and the like;

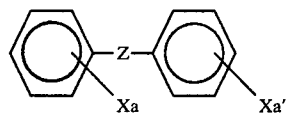
(II)

where X, a and a' are as previously described; Z may be oxygen, carbonyldioxy, sulfonyl, $C_1$-$C_4$ alkylene, phenylene, chlorinated or brominated phenylene, dioxy radicals of the formula —$OR_1O$— where $R_1$ is $C_1$-$C_4$ alkylene, phenylene or chlorinated or brominated phenylene, and either linkages of the formula —$CH_2O$—, —$CH_2OCH_2$— and —$C_6H_4CH_2OCH_2C_6H_4$—. Particularly preferred compounds of this class include those wherein Z is oxygen as exemplified by the polybrominated diphenyl ethers such as decabromodiphenyl ether and hexabromodiphenyl ether or where Z is an ether linkage as described above; and

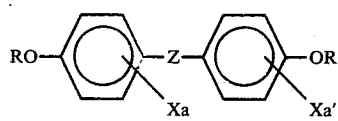
(III)

where X, a, a' and Z are as described previously in formula II and R represents $C_1$-$C_4$ alkyl, $C_1$-$C_4$ acyl radicals, phenyl and benzoyl radicals and chlorinated and brominated phenyl and benzoyl radicals. A preferred compound of this class is tetrabromobisphenol A diacetate.

The polyesters which are rendered flame retardant in accordance with the present invention, include the fiber-forming linear saturated polyesters derived from saturated aliphatic and aromatic dicarboxylic acids and saturated diols.

These fiber-forming saturated polyesters are prepared from dicarboxylic acids such as terephthalic acid, isophthalic acid, adipic acid, bibenzoic acid, 4,4'-dicarboxyphenylmethane, 2,6-naphthalenedicarboxylic acid, 1,3-cyclopentanedicarboxylic acid, 1,3- or 1,4-cyclohexanedicarboxylic acid and the like. Diols generally employed to prepare the fiber-forming polyesters are the saturated aliphatic, saturated cycloaliphatic or armoatic diols, preferably the lower alkane diols such as ethylene glycol, propylene glycol, and butylene glycol. Other exemplary diols include ethylene diglycol, dimethylolcyclohexane, 1,6-hexanediol, p-xylylenediol and the like. Particularly preferred are fiber-forming polyesters such as poly(ethylene terephthalate), poly(ethylene 2,6-naphthalenedicarboxylate) or poly(1,4-cyclohexylenedimethylene terephthalate) and blends of such polyesters. These fiber-forming polyesters generally have an average molecular weight of at least about 10,000.

Generally speaking, the total amount of two-component flame-retardant additive which is added to the polyester is from about 5 to 20% based on the combined weight of polyester and additive, that is, 5 to 20 parts by weight of additive and 95 to 80 parts by weight of polyester. These amounts provide the phosphorus, chlorine and bromine levels discussed below. The addition of amounts in excess of about 20% may interfere with the physical properties of the finished fiber as well as with the proper operation of the processing equipment, particularly the spinnerets used in extruding the fiber from the molten mixture of polyester and additive.

The relative amounts of phosphorus and chlorine or bromine present will, of course, be dependent on the degree of flame retardancy desired. In order to produce blends of polyester and cellulosic fibers which meet all existing standards for flame retardancy there should be present about 1 to 2% by weight of phosphorus in the fiber. At this phosphorus level, chlorine, if present, should be used in an amount such that the chlorine to phosphorus weight ratio is from 2:1 to 20:1. For the same level of phosphorus, that is, about 1 to 2%, the amount of bromine will be such that the weight ratio of bromine to phosphorus is between 2.5:1 and 10:1. Of course, both chlorine and bromine both may be present and in such case the chlorine to phosphorus weight ratio will be at the lower end of the aforesaid range, i.e., about 2:1 to 10:1 and the bromine to phosphorus weight ratio will be about 2.5:1 to 5:1. In any event, the polyester fiber should not contain more than about 12% by weight of bromine as a maximum.

Polyester fibers of the present invention, particularly those which contain the aforesaid two-component flame-retardant additive, are especially suitable for use in the preparation of blends of polyester with other fibers such as cotton, rayon, nylon, acetate, acrylics and the like. Particularly suitable are blends with cellulosic fibers such as rayon and acetate. Effectively rendering such blends flame retardant is a particular problem in the art, since under current standards the flame retardant qualities must be retained after repeated dry cleaning or laundering.

A particularly preferred embodiment resides in blends of 10 to 90 parts by weight, preferably 40 to 60 parts by weight, of a flame-retardant polyester fiber prepared in accordance with the present invention containing the aforesaid two-component flame-retardant additive with 90 to 10 parts by weight, preferably 60 to 40 parts by weight of flame-retardant regenerated cellulose filaments or fibers, as described in U.S. Pat. No. 3,455,713 issued July 15, 1969, to Godfrey. In brief, they are regenerated cellulose filaments having dispersed therein from 1 to 25% by weight of a substantially water-insoluble cyclical and/or, linear liquid phosphonitrilic polymer having the general formula:

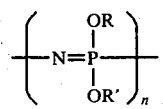

where R and R' are the same or different alkyl or alkenyl radicals having from 1 to 6 carbon atoms and n is an integer of at least 3 and not more than about 20. These fibers are prepared by incorporating a flame retardant amount of the phosphonitrilic polymer into filament-forming viscose, and spinning and regenerating the filament.

The invention is further illustrated by the following examples, which are not to be considered as limitative of its scope. All parts and percentages are by weight based on the total weight of the composition and temperatures are in degrees centigrade unless otherwise stated.

EXAMPLE I 3,9-diphenyl-2,4,8,10-tetraoxa-3,9-diphosphaspiro[5.5]undecane-3,9-dioxide was prepared as follows:

A mixture of 40.8 grams (0.3 mole) of pentaerythritol, 98 grams of pyridine, and 900 ml of methylene chloride was stirred and cooled to 15°. With stirring a solution of 117 grams phenylphosphonic dichloride in 180 ml of methylene chloride was added over a period of 0.5 hours. After stirring for 15 minutes at 15°, the cooling bath was removed. The reaction temperature steadily rose and after 20 minutes the reaction was refluxing. When the exotherm subsided, the mixture was heated at reflux for three hours. The pH was adjusted to about 7 with pyridine and the mixture allowed to stand overnight at room temperature. The reaction mixture was concentrated by removing 720 ml of methylene chloride by distillation. After cooling and standing the solids were collected by filtration, washed with methylene chloride and dried and washed with water three times to remove all traces of chloride. A white crystalline material was obtained upon drying, 64.6 g, mp. 263.5°–265°.

Anal. Calcd. for $C_{17}H_{18}O_6P_2$: %C, 53.70; H, 4.77; P, 16.29 Found: %C, 53.48; H, 4.94; P, 16.14

EXAMPLE II

The Limiting Oxygen Index (LOI) of plaques containing poly (ethylene terephthalate), 3,9-diphenyl-2,4,8,10-tetraoxa-3,9-diphosphaspiro[5.5]undecane-3,9-dioxide (from Example I) and varying amounts of either octabromobiphenyl, decabromodiphenyl either of decachlorobiphenyl was determined to demonstrate the high degree of flame retardancy imparted.

The plaques were prepared by grinding in a mortar mixtures of poly (ethylene terephthalate) and the flame retardant additive. On top of a 6"×6" stainless steel plate (1/32" thick) was placed a 6"×6" brass frame 1/32" thick with a 5¾"×5¾" opening. Nine grams of the powdered mixture was spread evenly on the Teflon® coated aluminum plate. A woven glass fabric (4-3/8"×5-3/8") weighing 3.9–4.1 grams was placed over the mixture inside the frame. An additional nine grams of the mixture was spread evenly over the cloth and covered with an identical Teflon coated aluminum plate and a stainless steel plate. The mold assembly was placed in a hydraulic press previously heated to 275° C. and the plates were closed gently at a slight pressure for 3 minutes to allow melting. The pressure was increased to 5 tons for 1 minute and then released. It was removed from the press, cooled between two large iron plates, and carefully taken apart to remove the glass fiber supported plaques. The plastic composite was cut into 3½"×1¾" strips.

The LOI is made by supporting the sample strip in a U-shaped frame which is mounted in a cylindrical open chamber. Controlled mixtures of oxygen and nitrogen gases are admitted into the base of the chamber and allowed to displace the normal atmosphere. When an equilibrium atmosphere in the chamber is obtained, the sample is ignited with a butane gas flame by contacting the flame with the top edge of the sample. If the sample fails to ignite, the oxygen ratio of the atmosphere is increased to a level where the flame will just propagate. Conversely, if the sample strip ignites and the flame propagates, the oxygen ratio of the atmosphere is reduced to a level where flame propagation is virtually zero. The LOI is the minimum percentage concentration of the oxygen atmosphere in which the test sample will ignite and permit flame propagation. The LOI test was introduced in 1966 (Fennimore et al, *Modern Plastics*, 43, 141 (1966) and is the basis for ASTM D-2863-70. The apparatus used was the Oxygen Index Flammability Tester (Model JD14) manufactured by MKM Machine and Tool Company, Inc.

The results are tabulated below:

| Sample No. | % P* | % Halogen* | LOI |
|---|---|---|---|
| 1 | 0 | 0 | 21.5 |
| 2 | 2 | 0 | 28.0 |
| 3 | 2 | 5% Br[a] | 30.8 |
| 4 | 2 | 5% Br[b] | 31.4 |
| 5 | 2 | 10% Br[b] | 32.1 |
| 6 | 2 | 9.2% Cl[c] | 31.0 |

[a] octabromobiphenyl was source of bromine
[b] decabromodiphenyl ether was source of bromine
[c] decachlorobiphenyl was source of chlorine
*These analyses are percent by weight phosphorus or halogen present in the sample.

An LOI value of at least 30 is desirable for polyesters which are to be blended with cellulosic fibers.

EXAMPLE III

A mixture of 19.0 grams of 3,9-diphenyl-2,4,8,10-tetraoxa-3,9-diphosphaspiro[5.5]undecane-3,9-dioxide and 134 grams of poly (ethylene terephthalate) was spun into a fiber at 280°. 103 grams of white fiber were collected. The denier was 62 and the intrinsic viscosity 0.635. The fiber contained 1.93% P by analysis versus 2.0% theoretically.

The fiber was blended with a flame-retardant regenerated cellulose yarn prepared in accordance with U.S. Pat. No. 3,455,713 containing about 15% by weight of a liquid polymer of di-n-propyl phosphonitrilate dispersed therein to give a yarn containing approximately 50% polyester fiber. The yarn was knitted into a 7.2 oz/sq. yard sleeve. The sleeve passed the AATCC vertical flame test (34-1966). The average char length of five burns was seven inches. None of the five test samples burned ten inches. No after flame occurred for any of the samples.

What is claimed is:

1. A flame-retardant polyester fiber composition comprising from about 95 to 80 parts by weight of one of the fiber-forming linear saturated polyesters selected from one of poly (ethylene terephthalate), poly (1,4-cyclohexylene-dimethylene terephthalate) and poly (ethylene 2,6-naphthalene dicarboxylate), and 5 to 20 parts by weight of a two-component flame-retardant additive consisting essentially of, by weight:
   (a) from about 20 to 80% of 3,9-diphenyl-2,4,8,10-tetraoxa-3,9-diphosphaspiro[5.5]undecane-3,9-dioxide, and
   (b) from about 80 to 20% of a polychlorinated or polybrominated diaryl compound containing at least 40% by weight chlorine or bromine and having the general formula

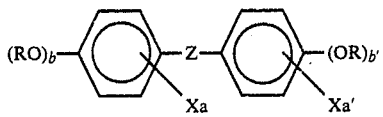

where X represents chlorine or bromine and a and a' are integers, the sum of which is from 3 to 10; b and b' represent zero and 1; R represents a member selected from the group consisting of $C_1$–$C_4$ acyl radicals, phenyl and benzoyl radicals and chlorinated and brominated phenyl and benzoyl radicals; Z represents a direct bond or a member selected from the group consisting of oxygen, carbonyldioxy, sulfonyl, $C_1C_4$ alkylene, phenylene, and chlorinated or brominated phenylene, dioxy radicals of the formula —$OR_1O$— where $R_1$ is $C_1$–$C_4$ alkylene, phenylene, or chlorinated or brominated phenylene, and ether linkages of the formula —$CH_2O$—, —$CH_2OCH_2$— and —$C_6H_4CH_2OCH_2C_6H_4$—, the flame-retardancy being defined by a Limiting Oxygen Index value of about 30 or more as determined by the test method defined in ASTM D-2863-70.

2. The composition of claim 1 wherein X represents bromine.

3. The composition of claim 2 wherein Z represents a direct bond and b and b' are zero.

4. The composition of claim 3 wherein the sum of a and a' is from 8 to 10.

5. The composition of claim 2 where Z represents a member of the group of oxygen and ether linkages of the formula —$CH_2O$—, —$CH_2OCH_2$— and —$C_6H_4CH_2OCH_2C_6H_4$—.

6. Flame retardant yarns and fabrics comprising a combination of the flame-retardant polyester fiber composition and a member of the group consisting of cotton, rayon, nylon, acetate and acrylic fibers, and further comprising from about 95 to 80 parts by weight of the fiber-forming polyester which is a member of the group consisting of poly(ethylene terephthalate), poly (1,4-cyclohexylenedimethylene terephthalate) and poly (ethylene 2,6-naphthalenedicarboxylate), and 5 to 20 parts by weight of a two-component flame-retardant additive consisting essentially of, by weight:

(a) from about 20 to 80% of 3,9-diphenyl-2,4,8,10-tetraoxa-3,9-diphosphaspiro[5.5]undecane-3,9-dioxide, and (b) from about 80 to 20% of a polychlorinated or polybrominated diaryl compound containing at least 40% by weight chlorine or bromine and having the general formula

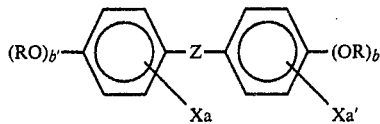

where X represents chlorine or bromine and a and a' are integers, the sum of which is from 3 to 10; b and b' represent zero and 1; R represents a member selected from the group consisting of $C_1$–$C_4$ alkyl radicals, $C_1$–$C_4$ acyl radicals, phenyl and benezoyl radicals and chlorinated and brominated phenyl and benzoyl radicals; Z represents a direct bond or a member selected from the group consisting of oxygen, carbonyldioxy, sulfonyl, $C_1$–$C_4$ alkylene, phenylene, and chlorinated phenylene, and ether linkages of the formula —$CH_2O$—, —$CH_2OCH_2$— and —$C_6H_4CH_2OCH_2C_6H_4$—.

7. The composition of claim 6 wherein said rayon is a regenerated cellulose fiber having dispersed therein a flame retardant amount of a water-insoluble, liquid phosphonitrilate polymer of the formula

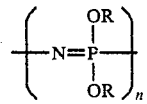

where R and R' are the same or different alkyl or alkenyl radicals having 1 to 6 carbon atoms and is an integer of at least 3.

8. The composition of claim 1 wherein the polychlorinated or polybrominated diaryl compound contains at least about 50% of halogen.

* * * * *

UNITED STATES PATENT AND TRADEMARK OFFICE
CERTIFICATE OF CORRECTION

PATENT NO. : 4,295,886
DATED : October 20, 1981
INVENTOR(S) : John T. Gresham

It is certified that error appears in the above—identified patent and that said Letters Patent are hereby corrected as shown below:

In column 7, line 12, correct spelling --- benzoyl ---.
In column 7, line 16, correct definition to read --- $C_1$-$C_4$ ---.
In column 8, line 21, correct spelling --- benzoyl ---.

Signed and Sealed this

Twenty-second Day of December 1981

|SEAL|

Attest:

GERALD J. MOSSINGHOFF

Attesting Officer   Commissioner of Patents and Trademarks